2,756,682

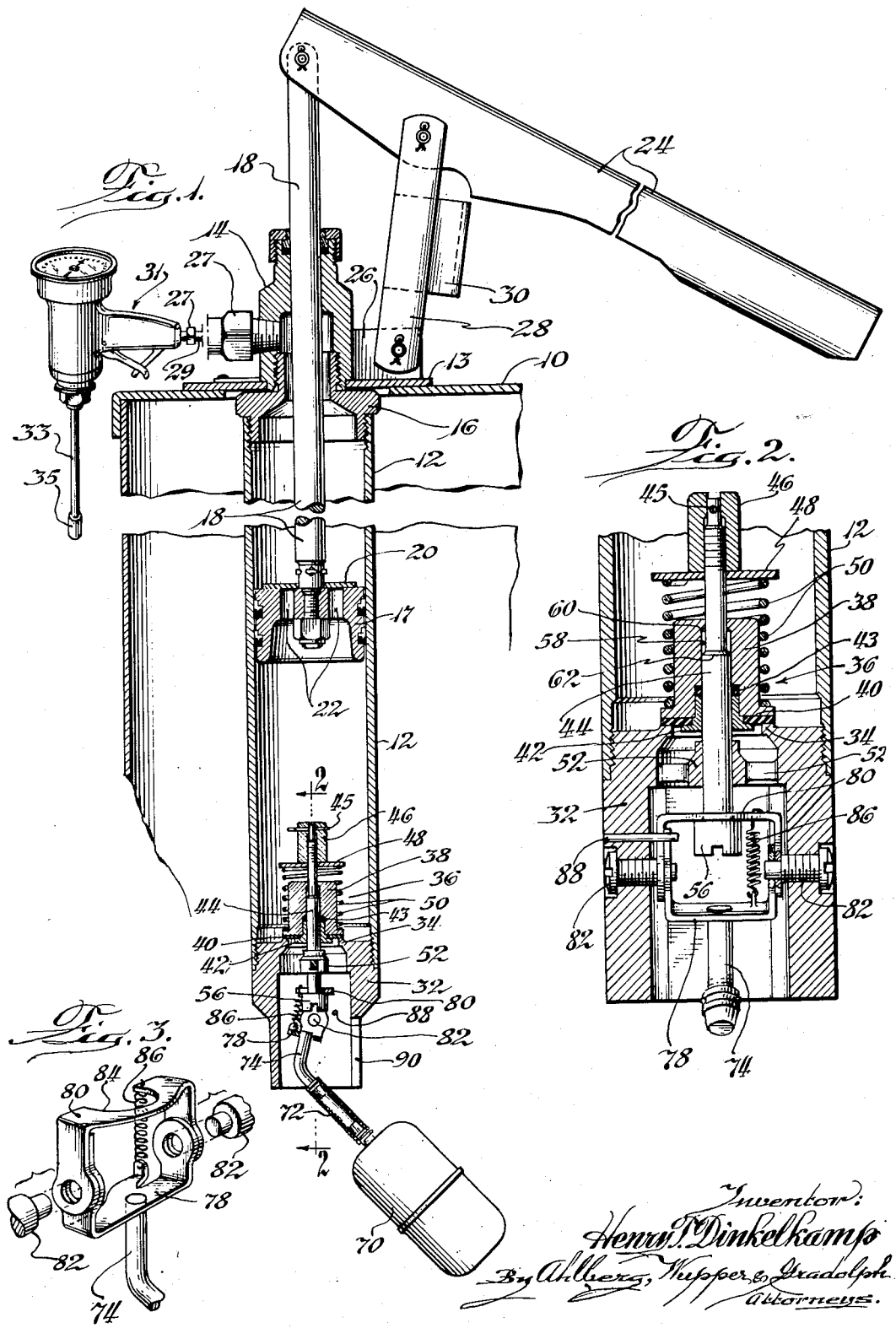

FLOAT OPERATED AIR ELIMINATOR

Henry T. Dinkelkamp, Niles, Ill., assignor to Stewart-Warner Corporation, Chicago, Ill., a corporation of Virginia Application January 22, 1953, Serial No. 332,742

9 Claims. (Cl. 103—178)

This invention relates generally to pumping apparatus, and more particularly to pumps employed as dispensers of oil and other liquids.

Particularly in dispensing pumps used in connection with the sale of oils and greases, it is desirable to provide some means for preventing air from being admitted to the inlet of the pump when the container with which the pump is used becomes nearly empty.

It is therefore the primary object of this invention to provide an improved mechanism for automatically preventing effective operation of the pump when the level of the oil or grease in the container drops below a predetermined level.

Other objects will appear from the following description, reference being had to the accompanying drawings, in which Fig. 1 is a central vertical sectional view of a lubricant pump, showing the meter and discharge nozzle in perspective;

Fig. 2 is an enlarged fragmentary central vertical sectional view taken on the line 2—2 of Fig. 1; and Fig. 3 is an exploded perspective view of particular parts of the mechanism.

In Fig. 1, the pump is illustrated as being mounted on the top of a container 10 for lubricant, which may be the drum in which the lubricant is shipped. The pump comprises a cylinder 12 which extends to a point close to the bottom of the container and is secured to the top of the container by a plate 13 and a fitting 14 threaded upon a cap 16, which in turn is threaded in the cylinder 12. A piston 17 is reciprocable within the cylinder 12 and is secured to the lower end of a piston rod 18. This rod has a reduced end portion forming a guide for a check valve 20 which closes ports 22 in the piston during the upstroke thereof. The piston rod is reciprocated by manual operation of a handle 24 pivoted to the upper end of the rod 18 and joined to a lug 26 forming part of the fitting 14 by a pair of links 28. The ends of links 28 are respectively pivoted to the handle 24 and the lug 26, the links being joined by a U-shaped strap 30 which may be welded or otherwise secured to the links and which forms a limit stop for the downward swinging movement of the handle 24.

The discharge opening of the pump is connected by suitable fittings 27 and a flexible hose 29 to a control valve and meter 31, the latter having a discharge pipe 33 which may have a suitable coupling 35 secured at its end.

A generally tubular foot valve fitting 32 is threaded in the lower end of the barrel or cylinder 12 and has an intake opening in a valve seat 34 which is engaged by a foot valve 36. This foot valve comprises a closure including a body 38 having a valve disc 40 secured to its bottom face by a bushing 42 pressed in the body, an O-ring seal 43 being provided to prevent leakage past a pin 44 which is freely reciprocable in the body 38. A nut member 46 is threaded at the upper end of the pin 44 and is secured by a cotter pin 45. This nut forms a seat for a washer 48. A relatively strong spring 50 is compressed between the washer 48 and the valve body 38, and biases the valve 40 to closed position.

The pin 44 is guided in a spider 52 which forms part of the fitting 32. The pin 44 has a kerfed head 56 at its lower end.

It will be noted that the upper end portion of the pin 44 is of reduced diameter and that the valve body 38 has a counterbore 58 to form a shoulder 60 which is adapted to abut against the shoulder 62 formed on the pin 44 at the place at which its diameter is reduced.

In the drawings, the foot valve is shown in its locked position. When freed, the spring 50 will expand until the shoulders 60 and 62 are in abutment. In other words, these shoulders form the limit stops for expansion of the spring 50.

A float 70 is carried by a tightly wound coil spring 72 which is secured to the end of a bent arm 74 fastened to a bail 78. Both the bail 78 and a bail 80 are pivoted on shouldered studs 82, which are threaded in the fitting 32.

The bail 80 has a semicircular notch 84 therein so as to form a latch engageable over the head 56 of the pin 44. A snap-over spring 86 has its ends secured to the bails 78 and 80, respectively, in such manner that when the float 70 is raised or swung counterclockwise to a sufficient extent, the spring will tend to swing the latching bail 80 clockwise from the position in which it is shown in Fig. 1, to the position in which it is in engagement with a stop pin 88. However, such movement is prevented by the frictional engagement of the head 56 with the latch, and on the other hand, when the float is lowered substantially to the position in which it is shown in Fig. 1, the spring 86 will tend to return the latching bail 80 to the position shown, but under these circumstances it would be prevented from moving completely to latching position, but instead will engage the side of the head 56 and will not move to latching position until the pin 44 has been depressed. This occurs when the end of the piston rod 18 engages the nut 46 at the end of a downstroke of the piston 16.

The fitting 32 is provided with a slot 90 sufficient to permit free passage of the coil spring 72, which may move upwardly to a position about 45 degrees above the horizontal.

Assume that the container 10 is being filled with oil: As the oil level rises, the float 70 will swing upwardly until it is in a position approximately 45 degrees above the horizontal. Then upon the first use of the pump on the downstroke of the piston 16, the end of the rod 18 will strike the end of the pin 44 and depress the latter sufficiently to permit the spring 86 to move the latching bail 80 clockwise to a position where it rests against the stop pin 88. Then upon the initial portion of the following upstroke of the piston 17, the spring 50 will operate to move the pin 44 upwardly until the stop shoulders 60 and 62 are in engagement. When in this position there will still be some clearance between the upper surface of the head 56 and the lower surface of the spider 52 so that the valve 36 may open freely, due to the atmospheric pressure when the piston 17 is traveling upwardly. The spring 50 is sufficiently strong that it can hold the valve seated against atmospheric pressure on the upstroke of the piston whenever the latching bail 80 is holding the pin 44 in its lower position.

It will thus be seen that when the float 70 swings downwardly to a predetermined level, the latch 80 will be conditioned for operation by virtue of the change in the direction of the force applied to the latching bail 80 by the spring 86, but the latch will not be effective to hold the pin 44 it its lowered positioned until, near the completion of the downstroke of the piston 17, the end of the rod 18 engages the nut 46 and depresses the pin 44 sufficiently to permit the latching bail 80 to move into latching position over the head 56 of the pin.

The coil spring 72 forms a convenient means for providing an operating connection between the float 70 and the bail 78, because it is sufficiently rigid to transmit the required forces but nevertheless flexible enough so that the float and the mechanism operated thereby will not be damaged if, in handling the pump, the float is inadvertently moved to a position beyond its normal operating range.

The spring 50 forms a useful function only when the pin 44 is latched in its lowered position, because then it prevents opening of the valve due to the suction of the pump, and therefore prevents admission of air to the pump cylinder 12. It is perhaps obvious that admission of air to the pump cylinder would not only result in an erroneous reading of the meter 31, but might in some cases be damaging to the parts supplied with lubricant.

For convenience in some of the following claims, the bails 78 and 80, together with the spring 86 and their associated parts, will be referred to as a "snap-over latch mechanism" by virtue of the fact that as the float swings upwardly and downwardly through its operating range, the latching bail 80 will be biased by the spring to snap from one position to another.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my inventiton may be obtained through the use of substantially the same or equivalent means.

I claim:

1. In a liquid dispensing pump of the type which depends into a container of the liquid to be pumped and has a cylinder with a piston and piston rod reciprocable therein, means for preventing admission of air to the cylinder when the level of the liquid in the container has been reduced to a predetermined level comprising, a foot valve fitting secured to the lower end of the cylinder and having means forming a valve seat, a valve body having a valve face cooperable with the valve seat, a pin reciprocable in said valve body and having a part projecting above the end of the valve body, a spring biased to move said pin upwardly with respect to the valve body, means on said valve body and pin to limit upward movement of the pin, a quick snap-over latching mechanism cooperable with a portion of the pin to prevent upward movement thereof under the influence of said spring, a float connected to the snap-over latching mechanism to hold said mechanism in a position where it is free from engagement with the pin when the level of the liquid in the container is above said predetermined level and operable to bias said snap-over latching mechanism to move to a position for latching engagement with the pin when the liquid in the container drops below said predetermined level, and means carried by said pin and engageable by said piston to move said pin downwardly against the force of said spring to a position where said latching mechanism may move to latching position and thereby restrain upward movement of the pin and thus hold the valve closed by virtue of the force due to the compression of said spring.

2. The combination set forth in claim 1, in which the spring which holds the valve in closed position applies a force sufficient to overcome atmospheric pressure and hold the valve closed during the suction stroke of the pump piston.

3. In a liquid dispensing pump of the type which is partially immersed in liquid in a container and has a cylinder and a piston and piston rod reciprocable in the cylinder, means responsive to the level of the liquid in a container from which it is being pumped to prevent admission of air to the pump cylinder, comprising, a float, means forming a foot valve seat, a foot valve, a pin mounted for limited reciprocation in the valve, a quick snap-over latch mechanism operable by the float to hold the foot valve against its seat, said mechanism being engageable with the pin, a spring operating between the pin and the foot valve biased to hold said foot valve upon its seat against atmospheric pressure when said pin is in its lowered position, and means engaged by the piston as it approaches the end of its downstroke further to compress said spring and to move said pin to position where it may be latched in lowered position by said quick snap-over latching mechanism.

4. The combination set forth in claim 3, in which the quick snap-over latching mechanism comprises a pair of pivoted bails, in which the float is connected to the first of said bails, in which said bails are spring biased to hold the second of said bails in latching or unlatching position, depending upon the position of the float, and in which the pin has a projection over which the second of said bails may move when the pin is depressed by the piston at the end of the downstroke of the latter and the level of the liquid in the container is lower than the said predetermined level.

5. The combination set forth in claim 4, in which the pin is guided by a portion of the means forming the foot valve seat.

6. A foot valve assembly comprising a body having a valve seat thereon, a valve member having means forming a surface for sealing engagement with the valve seat, a pin guided for reciprocation in the foot valve body, a part secured against upward movement with respect to the pin, a spring compressed between said part and the valve member, the guiding means for the pin permitting a substantial upward movement of the valve from its seat, means to limit upward movement of the pin relative to the valve member to less than the upward moveemnt of the pin permitted by the guide, means on the piston to move the pin downwardly against the force of said spring at the end of the downward stroke of the piston, and float operated means for latching the pin in substantially its lowermost position when the level of the oil in the container drops below a predetermined level.

7. A foot valve assembly comprising a body having an upwardly facing valve seat thereon, a valve member having means forming a surface for sealing engagement with the valve seat, a pin guided for reciprocation in the foot valve body, a part secured against upward movement with respect to the pin, a spring compressed between said part and the valve member, means to limit upward movement of the pin relative to the valve member, the pin being movably downwardly against the force of said spring, and float operated means for latching the pin in substantially its lowermost position when the level of surrounding liquid drops below a predetermined level.

8. Apparatus for pumping only liquid free of entrapped air, comprising, in combination, an elongated pumping cylinder adapted to extend vertically into liquid to be pumped, reciprocable pumping means slidably mounted in said cylinder, said pumping means including check valve means therein providing for a unidirectional flow of liquid therethrough from the lower end of said cylinder, means fixed to the lower end of said cylinder and defining a valve seat stationary with said cylinder and defining an intake opening thereinto, a movable closure member disposed on the inner side of said valve seat with respect to the interior of said cylinder for separable engagement with the valve seat to prevent reverse flow of fluid therethrough outwardly from the cylinder, movable latching element means, a strong spring connected between said latching element means and said closure member and having sufficient strength upon being stressed to hold the latter on said valve seat against the suction incident to movement of said pumping means away from said valve seat, said latching element means having a first portion thereof on the exterior side of said valve seat and a second portion thereof disposed on the interior side of said valve seat with respect to said cylinder, said second portion of said latching element means being positioned for engagement by said pumping means to stress said spring, a movable float adjacent the lower end of said cylinder; and latching means connected to said float and mounted on the lower end of said cylinder in co-operable relation to said first portion of said latching element means to effectively engage said first portion of said latching element means upon lowering of the level of the surrounding fluid below a predetermined value to hold the latching element means, after stressing of said spring by engagement of said second portion of said latching element means by said reciprocable pumping means, in a position in which said spring remains stressed to hold said closure member firmly against said valve seat.

9. Apparatus for pumping only liquid free of entrapped air, comprising, in combination, a pumping cylinder adapted to extend vertically into liquid to be pumped, reciprocable pumping means slidably disposed in said cylinder, said reciprocable pumping means including one-way valve means therein providing for a unidirectional flow of liquid therethrough from the lower end of the cylinder, means on the lower end of said cylinder forming a valve seat stationary with the cylinder and defining a fluid intake opening thereinto, a movable closure member disposed on the inner side of said valve seat with respect to the interior of said cylinder for separable engagement with the valve seat to prevent reverse fluid flow therethrough outwardly from the cylinder, latching means including components on said closure member and components mounted on the adjacent lower end of said cylinder for separable coaction together to releasably latch said closure member firmly against opening movement away from said valve seat, and a float control adjacent the lower end of said cylinder interconnected with said latching means to condition the latter upon lowering of the liquid around said cylinder below a predetermined level for engagement to hold said closure member against movement away from said valve seat.

References Cited in the file of this patent

UNITED STATES PATENTS

| | | |
|---|---|---|
| 2,016,984 | Buchet | Oct. 8, 1935 |
| 2,074,927 | Logette et al. | Mar. 23, 1937 |
| 2,269,857 | Nielsen | Jan. 13, 1942 |
| 2,570,445 | Hill | Oct. 9, 1951 |